United States Patent

Thomas

(10) Patent No.: US 6,484,484 B1
(45) Date of Patent: Nov. 26, 2002

(54) LAWN MOWER FOR PROVIDING POWER TO A GARDEN IMPLEMENT

(75) Inventor: Roger Thomas, Cleveland (GB)

(73) Assignee: Black & Decker Inc., Newark, DE (US)

(*) Notice: Subject to any disclaimer, the term of this patent is extended or adjusted under 35 U.S.C. 154(b) by 0 days.

(21) Appl. No.: 09/334,333

(22) Filed: Jun. 16, 1999

(30) Foreign Application Priority Data

Jun. 16, 1999 (GB) ................................ 9812933

(51) Int. Cl.[7] ............... A01D 34/03; A01D 34/44; A01D 34/66
(52) U.S. Cl. ........................... 56/13.7; 56/14.7
(58) Field of Search .................. 56/13.7, 14.7, 56/12.1, 12.2, 13.5, 13.6, 13.8, 16.9

(56) References Cited

U.S. PATENT DOCUMENTS

| | | | |
|---|---|---|---|
| 2,523,439 A | 9/1950 | May | |
| 2,857,725 A | 10/1958 | Canfield | |
| 2,948,544 A | 8/1960 | Rowe et al. | |
| 3,382,653 A | 5/1968 | De Buigne | |
| 3,504,169 A | * 3/1970 | Freeburger | 362/249 |
| 4,242,855 A | * 1/1981 | Beaver, Jr. | 56/13.7 |
| 4,321,784 A | 3/1982 | Wood et al. | |

(List continued on next page.)

FOREIGN PATENT DOCUMENTS

| | | |
|---|---|---|
| AU | 2487497 | 12/1997 |
| DE | 3136203 | 9/1981 |
| DE | 29508100 | 5/1995 |
| DE | 29712138 | 7/1997 |
| EP | 0111725 | 11/1983 |
| EP | 0367891 | 2/1989 |
| EP | 0625434 | 5/1994 |
| EP | 0714648 | 6/1996 |
| FR | 2252802 | 6/1975 |
| GB | 878834 | 10/1961 |
| GB | 919689 | 2/1963 |
| GB | 11411 | 1/1969 |
| GB | 1199310 | 7/1970 |
| GB | 1363341 | 8/1974 |
| GB | 1597925 | 9/1981 |
| GB | 2221373 | 2/1990 |
| GB | 2293095 | 3/1996 |
| GB | 2327916 | 2/1999 |
| WO | 9609752 | 4/1996 |
| WO | WO9628011 | 9/1996 |

*Primary Examiner*—Robert E. Pezzuto
*Assistant Examiner*—Árpád Fabián Kovács
(74) *Attorney, Agent, or Firm*—Harness, Dickey & Pierce, P.L.C.

(57) ABSTRACT

A garden power tool system comprises a lawn mower powered by a battery mounted on the mower and a plurality of electrically powered gardening implements such as a hedge trimmer and a string trimmer. The battery provides the electrical power for the garden implements when they are connected to the mower. The mower can be mounted on castor wheels. Ideally, the garden implements are releasably attachable via a connecting mechanism and an electric cable to the mower. The connecting mechanism provides electrical connection between the battery and the garden implements when attached and is sufficiently robust to enable the mower to be dragged around by the garden implement when connected.

18 Claims, 6 Drawing Sheets

U.S. PATENT DOCUMENTS

| | | | |
|---|---|---|---|
| 4,333,302 A | * | 6/1982 | Thomas et al. ............... 56/10.5 |
| 4,368,806 A | | 1/1983 | Raineri |
| 4,835,952 A | | 6/1989 | McLane |
| 4,870,811 A | | 10/1989 | Steele |
| 5,020,310 A | | 6/1991 | Oshima et al. |
| 5,210,998 A | | 5/1993 | Hojo et al. |
| 5,269,125 A | | 12/1993 | Langley, Sr. et al. |
| 5,297,379 A | | 3/1994 | Smith |
| 5,301,494 A | * | 4/1994 | Peot et al. ................... 56/10.5 |
| 5,303,532 A | * | 4/1994 | Phillips ...................... 56/12.7 |
| 5,355,664 A | | 10/1994 | Zenner |
| 5,463,855 A | | 11/1995 | Johnson et al. |
| 5,561,969 A | * | 10/1996 | Sandy ........................ 56/13.6 |
| 5,653,096 A | | 8/1997 | Edwards |
| 5,694,752 A | * | 12/1997 | Warfield, III ................ 56/13.6 |
| 5,727,372 A | * | 3/1998 | Kanitz et al. ................ 56/11.9 |
| 5,809,758 A | * | 9/1998 | Flanigan et al. ............. 56/13.7 |
| 6,032,443 A | * | 3/2000 | Aldrich ...................... 56/13.7 |

* cited by examiner

LAWN MOWER FOR PROVIDING POWER TO A GARDEN IMPLEMENT

BACKGROUND OF THE INVENTION

The present invention relates to garden implements and in particular to electrically powered garden implements.

Most household gardens comprise a number of different features such as trees, lawns, flower beds, bushes, rockeries, paths and patios. Therefore, a gardener requires a range of garden implements in order to assist him in the maintenance of the garden. The majority of these implements are powered, usually by an electrical motor. Such implements include hedge trimmers, blow vacs, string trimmers, chain saws, lawn mowers, reciprocating saws and edgers.

Electrically powered garden implements are either powered by a mains electricity supply or a battery.

Garden implements powered by a mains electricity supply have to be connected via a cable to the supply. This restricts the locations where the garden implements can be used to areas within reach of a power supply outlet which is determined by location of the power supply outlet and by the length of the cable.

Cable extensions can be added. However, this incurs additional costs.

Garden implements powered by a battery are not so restricted as to the locations where they can be used compared with mains powered tools. However, each tool requires a separate battery and separate charging system incurring the cost of a battery and charger for each tool. Furthermore, the battery is attached directly to the tool. This adds an additional burden to the user because, in addition to supporting the power tool itself, he has to support the battery. Large batteries used in such power tools can be heavy requiring the user to make a considerable exertion in order to support both the power tool and the battery.

The run of time of a power tool between the recharges of the battery is dependent on the size of the battery. However, the size of the battery has to be limited so that the user is able to both support and maneuver the power tool. Therefore, the run time between recharges is limited.

SUMMARY OF THE INVENTION

The object of the present invention is to overcome the above problems.

According to the first aspect of the present invention, a garden power tool system comprises a lawn mower and one or more electrically powered gardening implements. The mower is powered by a battery mounted on the mower. The garden implements are electrically powered by being connectable to the mower such that the battery provides the electrical power for the garden implements.

By powering the garden implements from the battery of the mower, there is no need for the garden implement to be used near to an electrical power outlet. The mower can be easily wheeled to the required location so that the garden implement can be used wherever desired.

Because the battery is mounted on the lawn mower, which in turn is supported via wheels on the ground, the user does not have to support or maneuver the battery when using the gardening implement. Furthermore, as the weight of the battery is supported by the mower, it can be considerably larger than if it were supported by the user. Therefore, a far larger battery can be used, greatly increasing the run time of the gardening implement between recharges.

Furthermore, the mower can be used to support the weight of part of a connected garden implement, thus lightening the load which a user has to bear when using the garden implement.

Preferably the mower is mounted on castor wheels. The lawn mower can be made to be highly maneuverable over the surface of the ground by mounting it on castor wheels to allow it to travel in any direction both linear and rotational. Because the garden implements are connected to such a mower, the tool system can easily be moved around in any direction either with any garden implement connected to it, or by the garden implement itself.

Preferably, the garden implements are releasably attachable via a connecting mechanism to the mower, the connecting mechanism, providing electrical connection between the battery and garden implement when attached.

This allows the garden implements to be detached from the mower when not required.

Ideally, the connecting mechanism is sufficiently robust to enable the mower to be dragged around by the garden implement when connected. This allows the mower to be maneuvered around by the garden implement without the garden implement becoming detached.

Certain garden implements can be attached directly to the mower for example a shredder. However, for other garden implements such as hand held implements it is advantageous that the garden implement is attached to the mower via an electric cable. This allows the garden implement to be used remotely from the mower. This is a particularly useful feature, as the garden implement can be used in places not easily accessible to the mower such as up a tree. Furthermore, the mower may be easily dragged around by the garden implement via the cable.

The electric cable may be flexible in length. Such cables can include cable coiled in a helical spring which is able to stretch when a force is applied to the cable.

The use of such a cable enables any excess length of cable between the mower and garden implement to be kept tidy and as such, it is less of a safety hazard.

The mower can comprise a handle which is releasably attachable to the mower. Alternatively or additionally, the mower can comprise a handle which is capable of being folded down onto the body of the mower. When the mower is being dragged around by a garden implement, the handle of the mower may get caught in bushes or ornaments. Therefore, when it is not being used to maneuver the mower, it is desirable to either remove it or fold it away. Many types of mower comprise a grass box for catching the grass cuttings. However, as the mower itself is not being used whilst a garden implement is being used, it is also preferable that the grass box is releasably attachable so that it can be removed to minimize the size of the mower.

Examples of such garden implements are a hedge trimmer, a shredder, a string trimmer, a chain saw, a shrubber, a weeder, a pruner and any other hand held electrically powered garden implement.

According to the second aspect of the present invention, a lawn mower, powered by a battery mounted on the mower, comprises a connecting mechanism in electrical connection with the battery which is capable of being connected to one or more gardening implements to enable the battery to power the garden implements when they are connected to the connection mechanism.

Ideally the connecting mechanism is sufficiently robust to enable the mower to be dragged around by the connecting mechanism.

The mower can comprise a handle and/or a grass box which is releasably attachable to the mower.

BRIEF DESCRIPTION OF THE DRAWING

An embodiment of the present invention will now be described with reference to the accompanying drawing of which.

DESCRIPTION OF THE PREFERRED EMBODIMENT

The garden power tool system comprises a lawn mower and a plurality of electrically power garden implements which can be connected to the lawn mower.

Figure 1:
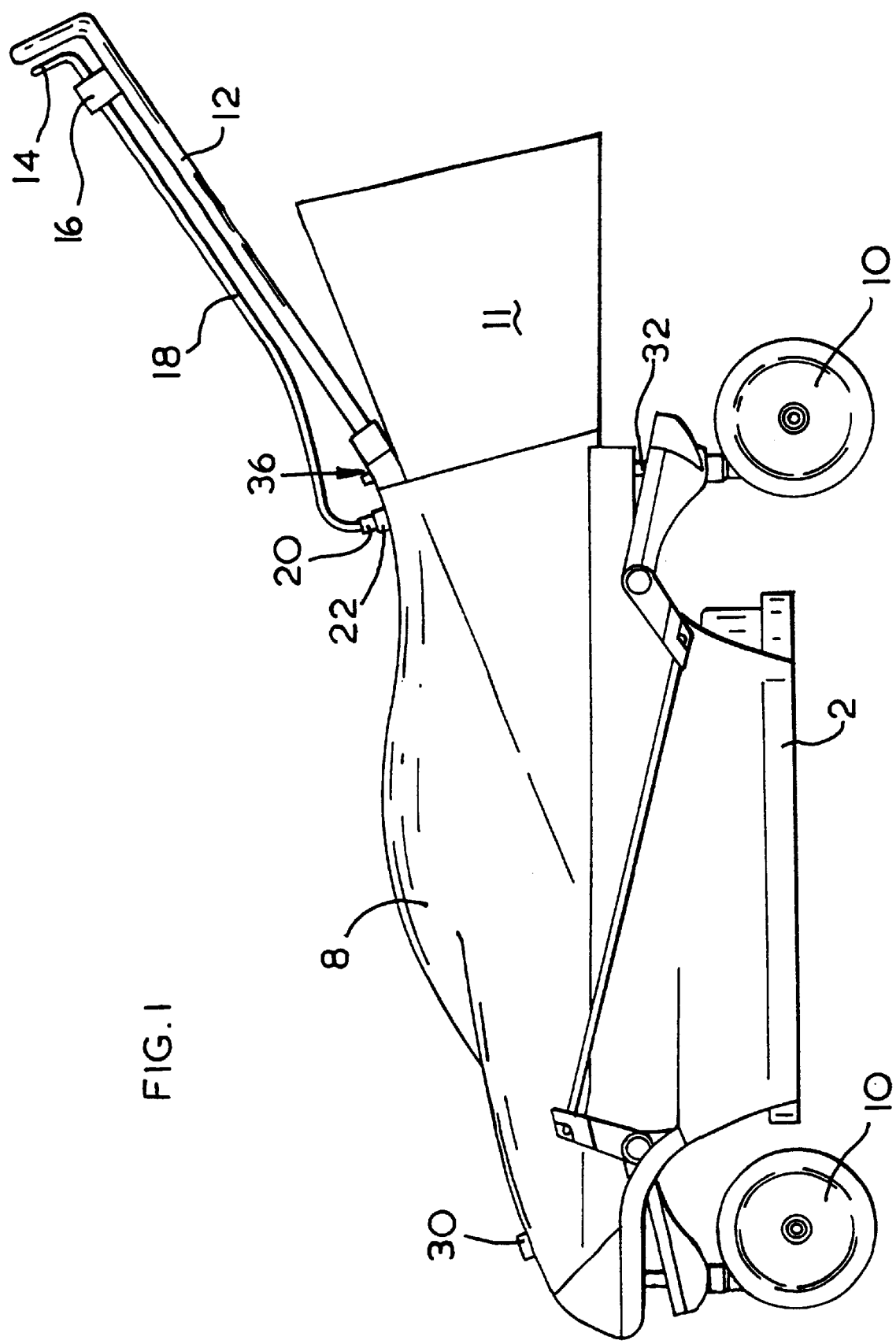
FIG. 1 shows a side view of the lawn mower according to the first embodiment of the present invention.
Figure 2:
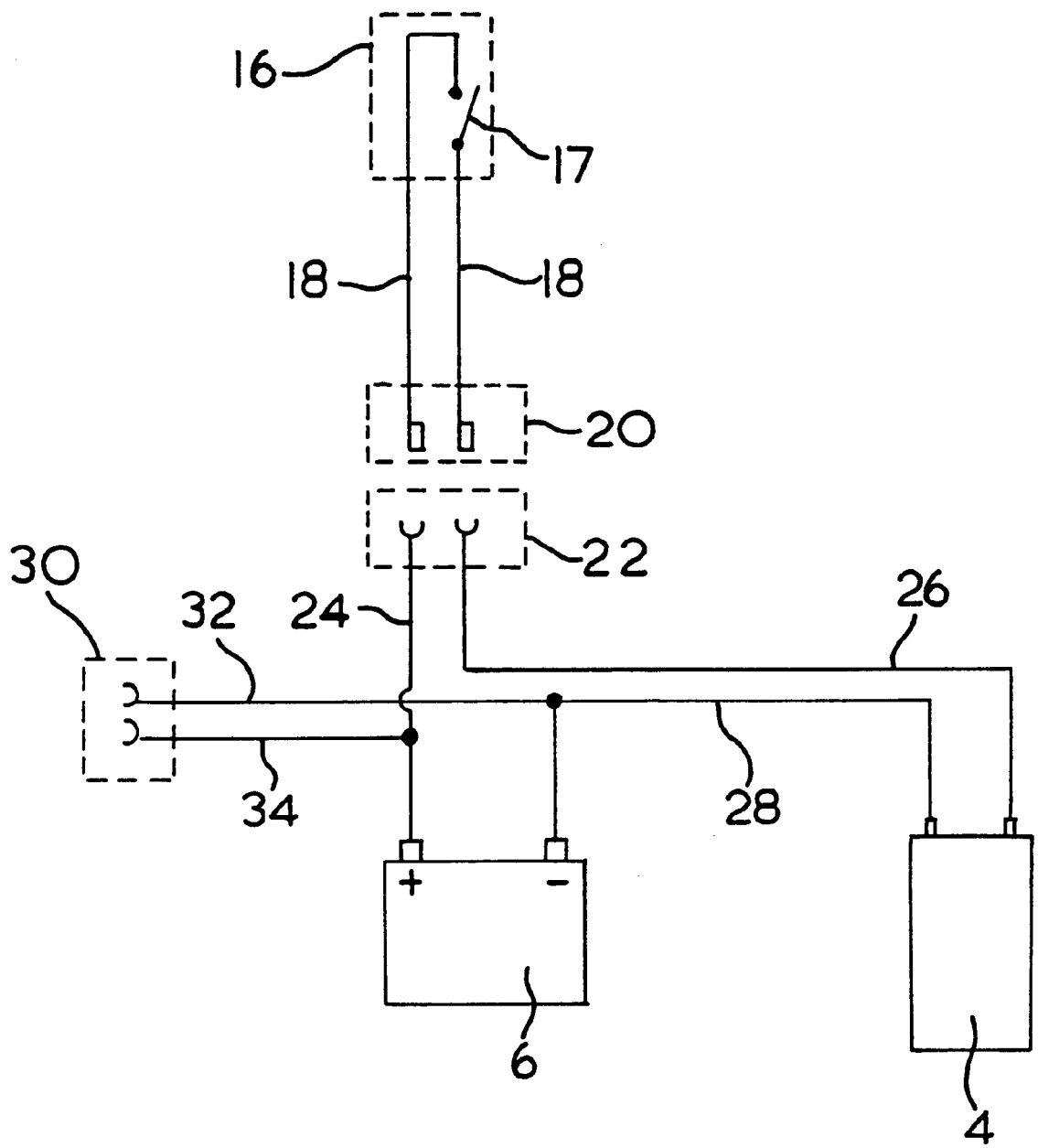
FIG. 2 shows the electrical circuit of the lawn mower.

The first embodiment of the present invention will now be described. Referring to FIG. 1, the lawn mower comprises a cutting deck 2 upon which is mounted a motor 4 and a battery 6. A hood 8 encloses the motor 4 and battery 6. The cutting deck 2 is mounted on four castor wheels 10 located near to the four corners of the cutting deck 2. The motor 4 rotatingly drives a cutting blade not shown mounted below the cutting deck 2 on the output drive spindle of the motor 4 about a substantially vertical axis. A grass box 11 is attached to the rear of the deck 2. A detachable handle 12 is attached to the rear of the deck 2. Located on the handle 12 is a lever 14 which projects from a lever box 16 attached to the handle 12 and which encloses an electric switch 17. Two electric cables 18 run from the lever box 16 to a plug 20. A corresponding socket 22 is mounted on the rear of the cutting deck 2. A cable 24 runs under the hood 8 from the socket 22 to a terminal of the battery 6. FIG. 2 shows the internal wiring diagram of the mower. A second cable 26 runs from the socket 22 to a terminal of the motor 4. A third electric cable 28 runs between the battery 6 and the motor 4. An electric circuit is formed between the motor 4 and the battery 6 via the electric switch 17 when the plug 20 is connected to the socket 22. The electric circuit is completed by the activation of the electric switch 17 by depression of the lever 14, thus energizing the electric motor 4.

A second socket 30 is mounted on the front of the cutting deck 2. Two electric cables 32, 34 run from the terminals of the battery 6 to the second electric socket 30. The socket comprises a bayonet connector.

The handle 12 is detachably connected to the rear of the deck by a clip mechanism 36. When the clip mechanism 36 is released, the handle 12 is detached from the body of the mower. The electric cables 18 which run from the lever box 26 on the handle 12 to the body of the mower is released by unplugging the first plug 20 from the socket 22 mounted on the rear of the cutting deck 2.

The disconnection of the first plug 20 and socket 22 does not interfere in any way between the electrical connection between the battery 6 and the second socket 30 on the side of the cutting deck.

Figure 3:
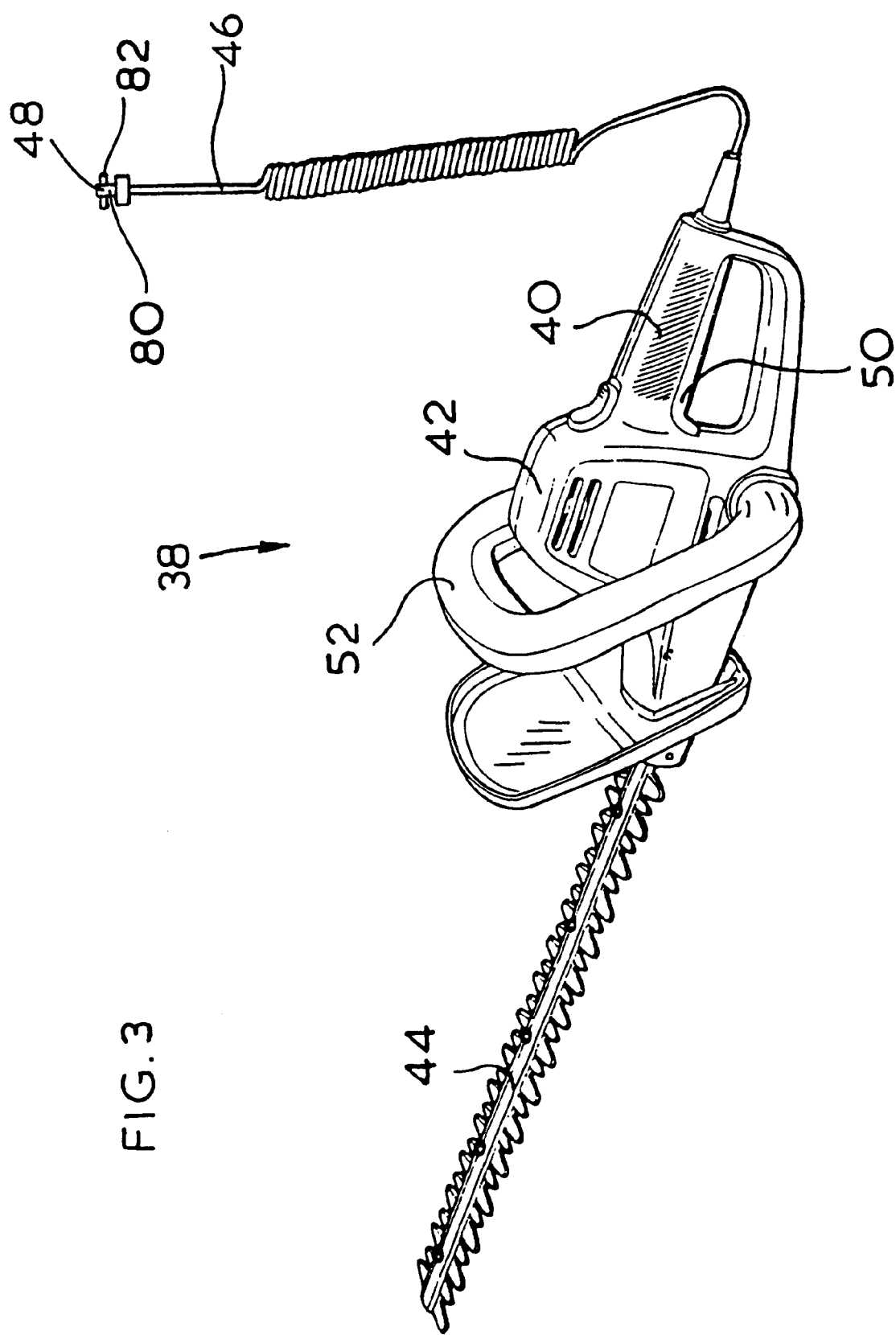
FIG. 3 shows the hedge trimmer garden implement.

FIG. 3 shows a hedge trimmer garden implement 38 which is attachable to the lawn mower. The hedge trimmer 38 comprises a rear handle 40 which is attached to the rear of the body 42 of the hedge trimmer 38. An electric motor not shown is located within the body 42. The motor reciprocatingly drives the hedge trimmer blades 44 attached to the front of the hedge trimmer 38 in a known manner. A helical stretchable electric cable 46 extends from the rear of the rear handle 40 to an electric plug 48 having a bayonet connection which is capable of mating with the second socket 30 on the lawn mower. The electric cable 46 passes through the rear handle 40 via a trigger switch 50 mounted on the rear handle 40 to the electric motor. A front bail handle 52 is mounted on the front of the body 42 of the hedge trimmer 46.

Figure 4:
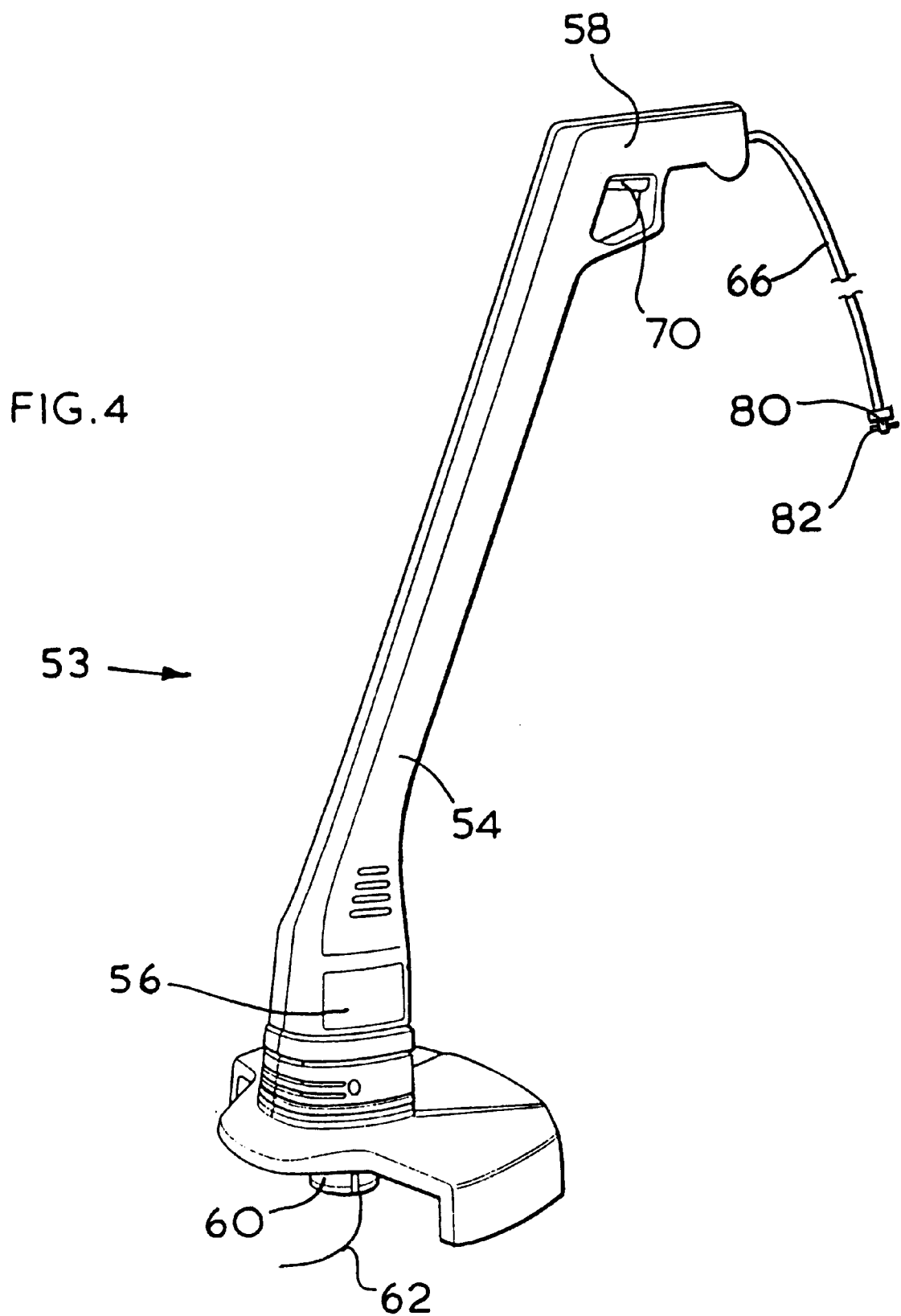
FIG. 4 shows the string trimmer garden implement.

FIG. 4 shows a string trimmer 53 comprising an elongate rod 54 having a motor housing 56 formed at one end and a rear handle 58 formed at the other. An electric motor not shown is mounted within the motor housing 56 which rotatingly drives a cutting head 60 in a known manner. A cutting line 62 extends from the cutting head 60. An electric cable 66 extends from the rear handle 58 to an electric plug 68 having a bayonet connection which is capable of mating with the second socket 30 on the lawn mower. The cable 66 passes through the rear handle 58 via a trigger switch 70 mounted on the rear handle 58, through the elongate rod 54 to the motor.

In use, a gardener would mow the lawn using the lawn mower in the known fashion. The gardener then may wish to trim the hedges. The gardener would connect the plug 48 of the hedge trimmer garden implement 38 into the second socket 30 located on the side of the cutting deck 2 of the mower. When the hedge trimmer garden implement 38 is connected to the socket 30 an electrical circuit is formed between the electric motor of the hedge trimmer 38 and the battery 6 of the mower via the trigger switch 50 on the hedge trimmer 38. Depression of the trigger switch 50 activates the motor and thus starts the hedge trimmer.

The gardener would commence trimming the hedges. As the gardener moves around the garden with the hedge trimmer garden implement 38, the mower would be pulled behind by the gardener via the electric cable 46. The plug 48 and socket 30 connection is robust enough to withstand the pulling forces exerted onto the cable 46. Because the mower is mounted on castor wheels 10, it is able to follow the gardener with hedge trimmer attachment 38 in any direction and can easily change direction when required.

The handle 12 of the mower may become entangled in the hedges as it is pulled along by the gardener. Therefore, the handle 12 can be detached by unclipping the handle 12 from the cutting deck 2 and disconnecting the first plug 20 from the socket 22 at the rear of the deck 2. In this fashion, only the body of the mower is pulled along behind the gardener.

In order to change implements, the plug 48 of the hedge trimmer attachment 38 is removed from the second socket 30, and the plug 68 of the string trimmer attachment 53 is connected to the second socket 30. The string trimmer attachment is then used in the normal manner, the mower being pulled along behind the trimmer via the cable 66.

In the second embodiment of the present invention, the hedge trimmer attachment 38 and string trimmer attachment 53 is permanently connected via a cable directly to the battery 6, thus avoiding the need for a plug 48; 68 and the second socket 30. When not being used, the attachments 38; 53 are stored in specifically formed recesses integrally molded into the hood 8 of the mower.

The third embodiment of the present invention is the same as the first embodiment except that the grass box 11 is detachable and that the handle 12 is capable of being folded onto the body of the mower.

Figure 5:
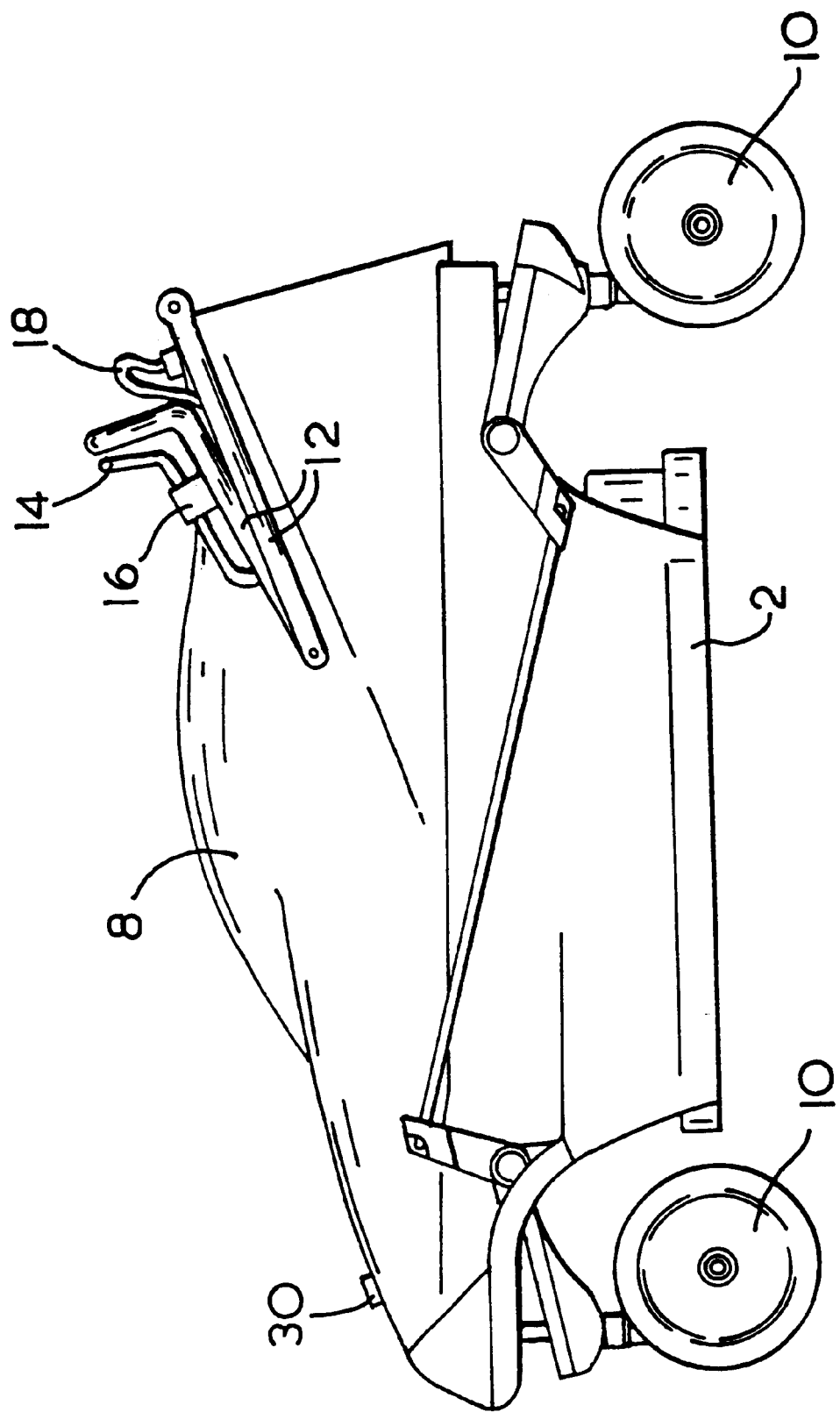
FIG. 5 shows a side view of the lawn mower according to the third embodiment of the present invention.

FIG. 5 shows the lawn mower according to the third embodiment in which the grass box 11 has been removed and the handle folded up.

Figure 6:
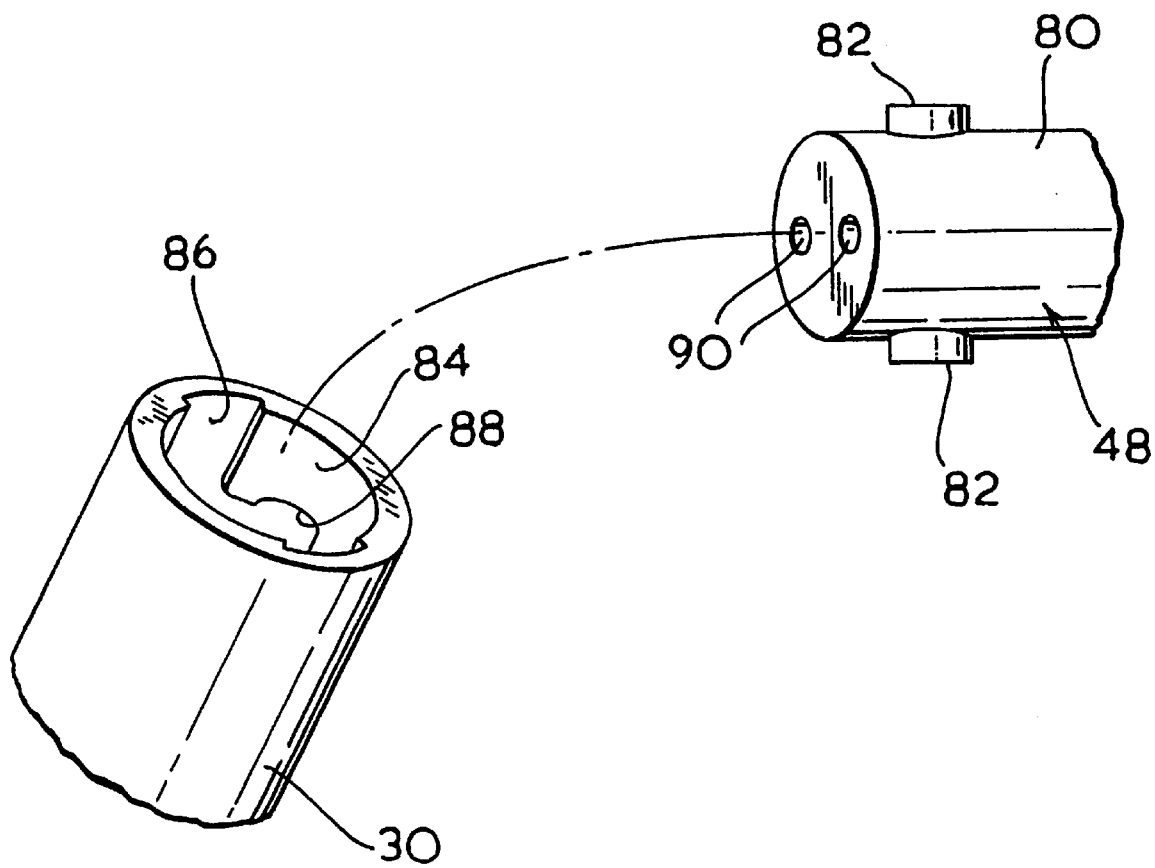
FIG. 6 shows the bayonet connection for the lawn mower and garden tool.

FIG. 6 shows the electric plug 48 having the bayonet connection. While FIG. 6 illustrates the electric plug 48, the electric plug 68 also has the bayonet connection shown in FIG. 6. The electric plug 48 includes a body 80 and a pair of radially extending lugs 82. Socket 30 includes a center bore 84 which accepts body 80 and a pair of slots 86 which accept the pair of lugs 82. Once assembled, the electric plug 48 is rotated such that the pair of lugs 82 engage a pair of stops 88 (only one shown). The pair of stops 88 in conjunction with the pair of lugs 82 provide the robust connection which withstands the pulling forces exerted onto the cable 46 while a pair of contacts 90 maintain the necessary electrical connection between the electric plug 48 and the socket 30.

While the invention has been explained by reference to a preferred embodiment, those skilled in the art will appreciate that various modifications and variations can be made without departing from the spirit and scope of the invention. Thus the present invention is intended to cover all such modification and variations provided they are covered by the appended claims and their equivalents.

What is claimed is:

1. A garden power tool system comprising:
   a non-riding lawn mower;
   a separate electrically powered garden implement releasably connectable to the mower;
   a battery mounted on the mower;
   a first electrical connection disposed between the battery and the lawn mower;
   a second electrical connection disposed between the battery and the electrically powered garden implement, said second electrical connection including an electrical cable and electrical contact members disposed between the electrical cable and a receptacle on the non-riding lawn mower;
   a mechanical connecting mechanism including mating elements attached to the lawn mower and to the electrical cable of the electrically powered garden implement, the mating elements of the mechanical connecting mechanism being releasably engageable with one another for supplementing the second electrical connection and providing a robust connection for connecting the mower to the electrically powered garden implement, the mechanical connecting mechanism enabling a user to drag the lawn mower using the electrically powered garden implement and the mechanical connecting mechanism.

2. The tool of claim 1 further comprising a deck and caster wheels for mounting the deck.

3. The tool system of claim 1 wherein the mower comprises a deck and a handle releasably attachable to the deck.

4. The tool system of claim 1 wherein the mower comprises a deck and a handle foldable onto the deck.

5. The tool system of claim 1 wherein the mower comprises a deck and a grass box releasable attachable to the deck.

6. The tool system of claim 1 wherein the electrically powered garden implement is selected from the group consisting of a hedge trimmer, string trimmer, a chain saw, a shrubber, a weeder and a pruner.

7. The tool system of claim 1 wherein the mechanical connecting mechanism includes a bayonet connector.

8. A non-riding lawn mower for use in a power tool system comprising:
   a deck;
   a battery mounted on the deck;
   a first electrical connection disposed between the battery and the lawn mower;
   a second electrical connection adapted to be connected to a separate electrically powered mechanism, said second electrical connection including an electrical cable and electrical contact members disposed between the electrical cable and a receptacle on the non-riding lawn mower;
   a mechanical connecting mechanism including releasably engageable mating elements supplementing the second electrical connection and adapted to provide a robust connection enabling a user to drag the lawn mower using the electrically powered mechanism through the mechanical connecting mechanism.

9. The non-riding lawn mower of claim 8 wherein the mower comprises a deck and a handle releasably attachable to the deck.

10. The non-riding lawn mower of claim 8 wherein the mower comprises a deck and a handle foldable onto the deck.

11. The non-riding lawn mower of claim 8 wherein the mower comprises a deck and a grass box releasably attachable to the deck.

12. The non-riding lawn mower of claim 8 wherein the mechanical connecting mechanism includes a bayonet connector.

13. A garden tool system comprising:
   a non-riding lawn mower;
   a battery mounted on the lawn mower;
   an electrical connection between the lawn mower and the battery;
   a separate electrically powered garden implement releasably connectable to the mower;
   an electrical cable disposed between the lawn mower and the garden implement, the electrical cable connecting the garden implement to the mower and providing electrical communication between the battery and the garden implement;
   a frictional electrical connection provided between said electrical cable and said lawn mower;
   a mechanical connecting mechanism including mating elements attached to the lawn mower and to the electrical cable of the powered garden implement, the mating elements of the mechanical connecting mechanism being releasably engageable with one another for supplementing said frictional electrical connection, the mechanical connecting mechanism providing a robust connection for connecting the mower to the electrical cable, the robust connection enabling a user to drag the lawn mower using the electrical cable.

14. The tool system of claim 13 wherein the mechanical connecting mechanism includes a bayonet connector.

15. The tool system of claim 13 wherein the electrically powered garden implement is selected from the group consisting of a hedge trimmer, string trimmer, a chain saw, a shrubber, a weeder and a pruner.

16. The garden tool system as claimed in claim 13, wherein the connecting mechanism further comprises:
   a plug having at least one bayonet extending radially outward from the plug, the plug electrically connected to the electrical cable; and a socket attached to and electrically communicating with the lawn mower, the socket having a aperture to receive the plug, at least one recess extending into an inside diameter of the aperture to receive the bayonet; and wherein the at least one bayonet is mated with the at least one recess to robustly connect the plug to the socket.

17. The garden tool system as claimed in claim 16, further comprising:

two bayonets, each of said two bayonets extending in opposite radial directions from said plug; and wherein the aperture includes two recesses disposed on radial opposite sides of said inside diameter of the aperture, the two recesses extending from an axial end of said socket to an axial depth inside the aperture, the recesses extending from the depth in a second direction radially around the inside diameter.

18. The garden tool system as claimed in claim 16, wherein the lawn mower has caster wheels.

* * * * *